US005687105A

United States Patent [19]

Miyamori et al.

[11] Patent Number: 5,687,105

[45] Date of Patent: Nov. 11, 1997

[54] PROCESSING DEVICE PERFORMING PLURAL OPERATIONS FOR PLURAL TONES IN RESPONSE TO READOUT OF ONE PROGRAM INSTRUCTION

[75] Inventors: Hideo Miyamori; Masatada Wachi; Mitsumi Kato, all of Hamamatsu, Japan

[73] Assignee: Yamaha Corporation, Japan

[21] Appl. No.: 708,788

[22] Filed: Sep. 9, 1996

Related U.S. Application Data

[63] Continuation of Ser. No. 257,817, Jun. 9, 1994, abandoned.

[30] Foreign Application Priority Data

Jun. 11, 1993 [JP] Japan ........................ 5-141008

[51] Int. Cl.[6] .................. G06F 17/10; G10H 1/12

[52] U.S. Cl. .............. 364/724.13; 84/661; 84/DIG. 9; 364/724.01; 381/61; 395/559

[58] Field of Search .................. 84/661, DIG. 9; 364/572, 724.01, 724.13; 381/61; 395/559

[56] References Cited

U.S. PATENT DOCUMENTS 4,679,077 7/1987 Yuasa et al. .............. 340/518 X
5,034,907 7/1991 Johnson et al. .............. 364/724.13 X
5,157,215 10/1992 Nakae et al. .............. 84/DIG. 9 X
5,255,202 10/1993 Kido et al. .............. 364/724.01 X
5,293,611 3/1994 Wada .............. 395/492
5,297,071 3/1994 Sugino .............. 364/736
5,410,603 4/1995 Ishiguro et al. .............. 84/626 X
5,432,296 7/1995 Takeuchi et al. .............. 84/DIG. 9 X
5,502,277 3/1996 Sakata .............. 84/661
5,546,466 8/1996 Ishiguro et al. .............. 381/61
5,570,424 10/1996 Araya et al. .............. 381/61
5,583,309 12/1996 Fujita .............. 84/622
5,597,970 1/1997 Sato et al. .............. 84/604

*Primary Examiner*—Edward R. Cosimano
*Attorney, Agent, or Firm*—Graham & James LLP

[57] ABSTRACT

A digital signal processor (i.e., DSP) is employed by an electronic musical instrument. The contents of operational processes to be executed by the DSP can be arbitrarily set in accordance with filtering operations of the filters to be realized. A processing device to be embodied by the DSP at least contains a microprogram memory, a coefficient register, a delay memory and a processing portion. A desired set of coefficients are read from the coefficient register in accordance with a first address signal, while a desired program is read from the microprogram memory in accordance with a second address signal. Each program contains at least one operational command or one instruction. The value of each of the first and second address signals is periodically changed in each sampling period. During a writing operation of the delay memory, results of the operational processes effected by the processing portion are written into the delay memory, while the processing portion effects the operational processes on the musical tone signals, sequentially inputted thereto, in accordance with the desired program to be repeatedly executed for the desired set of coefficients. When a reading operation of the delay memory is designated, the processing portion effects the operational processes on data read from the delay memory. Thus, the processing device can perform the pipeline processing effectively on plural series of musical tone signals with a reduced storage capacity of the microprogram memory.

26 Claims, 5 Drawing Sheets

FIG.3A Sad1
to
8n
1
SAMPLING PERIOD
t
FIG.3B Sad2
0 1 2 3 4 5 6 7
t
FIG.3C Sad3
-n
1
n
t
FIG.3D ΦDAC
t
FIG.3E Sad4
1 2 3 4 5 6
n-1 n
8
t
FIG.3F Win
t
n 1 2 3 4 5 6
n-1 n 1 2
FIG.3G Sin
6 n-1
6n-2
FIG.3H Sads
o
t

AN EXAMPLE OF MICROPROGRAMS

| STEP | PROGRAM |
|---|---|
| SP1 | Temp= Sin ×ig |
| SP2 | Temp= Temp×a1 |
| SP3 | Temp=Temp+a2 ×Zi1 |
| SP4 | Temp=Temp+a3 ×Zi2 |
| SP5 | Temp=Temp+b1 ×Zo1 |
| SP6 | Temp=Temp+b2 ×Zo2 |
| SP7 | Temp= Temp×og |
| SP8 | Sout=Temp |

FIG. 6

PROCESSING DEVICE PERFORMING PLURAL OPERATIONS FOR PLURAL TONES IN RESPONSE TO READOUT OF ONE PROGRAM INSTRUCTION

This is a continuation of application Ser. No. 08/257,817 filed on Jun. 9, 1994, now abandoned.

BACKGROUND OF THE INVENTION

1. Field of the Invention

The present invention relates to a processing device which carries out several kinds of operational processes for an electronic musical instrument.

2. Prior Art

In the electronic musical instruments or the effecters conventionally known, the operational circuits for performing arithmetical operations, such as digital filters, are employed carry out several kinds of operational processes (or algorithmic operations) on musical tone signals. When being applied electronic musical instrument, the digital filter is designed as a second-order filter, for example. FIG. 5 shows an example of the electronic configuration of the digital filter.

In FIG. 5, multipliers 101 to 107 multiply signals supplied thereto by coefficients 'ig', 'a1', 'a2', 'a3', 'b1', 'b2' and 'og' respectively. An adder 108 adds output signals of the multipliers 102–106 together. Each of delay circuits 109 to 112 delays a signal supplied thereto by a certain delay corresponding to one clock (i.e., one sampling clock).

By adequately setting the coefficients a1, a2 and a3, a certain filtering characteristic can be set for the filter shown in FIG. 5. In other words, the function of the digital filter can be selected from among the low-pass filter, high-pass filter, band-pass filter and band-elimination filter, for example.

When an input signal 'Sin' is supplied to the multiplier 101, the multiplier 107 produces an output signal 'Sout', which is obtained by effecting a certain filtering operation on the input signal Sin.

In general, the digital filter shown in FIG. 5 is embodied by a digital signal processor (i.e., DSP). Herein, the DSP carries out several kinds of microprograms, the contents of which can be changed responsive to the function of the operational circuit to be embodied. The microprograms corresponding to the function of the digital filter shown in FIG. 5 can be described by FIG. 6.

In FIG. 6, a so-called pipeline processing is employed. According to the feature of the pipeline processing, after one step is executed, the execution of the next step is started before the result of the one step is obtained, so that a series of operations can be carried out at a high speed. However, such feature cannot be demonstrated well in the processing device conventionally employed by the electronic musical instrument. The reasons will be described below.

In the microprograms shown in FIG. 6, the input signal Sin is multiplied by the coefficient 'ig' so as to produce a variable 'Temp' in a step SP1; and then, this variable 'Temp' is multiplied by the coefficient 'a1' in a step SP2.

Thus, in order to execute the step SP2, there should be a precondition where the execution of the step SP1 must be completely finished so that the variable Temp is certainly obtained. In other words, before the execution of the step SP1 is completely finished, the execution of the step SP2 cannot be started. The same thing can be said to the other steps following the step SP2. Particularly, the multiplication is performed in each of the steps SP1–SP7, so that a relatively long execution time should be required for each of those steps.

Since the microprograms shown in FIG. 6 contain a plenty of calculations each of which requires a relatively long time, the total execution time should be long. However, if only one series of musical tone signals are treated by the DSP, there is no problem which substantially affects the performability of the electronic musical instrument.

In the recent years, in order to improve the performability of the electronic musical instrument, it is proposed to use a plurality of sound sources and to effect a different kind of filtering operation on each of the musical tone signals respectively outputted from the sound sources. FIG. 4 is a conceptual diagram simply showing the configuration of the electronic musical instrument newly proposed. In FIG. 4, musical tone signals outputted from plural sound sources 50-1 to 50-n are supplied to a DSP 200 in which they are respectively subjected to filtering operations by filters 51-1 to 51-n.

Then, filtered musical tone signals are supplied to a mixer 52 in which they are mixed together to form a mixed musical tone signal. The mixed musical tone signal is converted into an analog signal by a digital-to-analog converter 53. This analog signal is supplied to a sound system 54, so that the corresponding musical tone is produced. Meanwhile, it may be possible to embody all of the filters 51-1 to 51-n in the form of the hardware circuits. However, this enlarges the size of the device; hence, this is not realistic. Thus, it is preferable to use a pair of operational devices in a time-division manner.

Even when the functions of the filters 51-1 to 51-n are embodied by a pair of operational devices which are used in a time-division manner, there occurs some problems, which will be described below.

In the microprograms shown in FIG. 6, total eight steps are required for effecting a filtering operation on one series of musical tone signals.

Thus, it may be possible to effect the filtering operations on 'n' series of musical tone signals (where 'n' is an integral number) by a time-division-multiplex system. In this case, however, it is necessary to execute '8n' steps of microprograms within one sampling clock. As described before, the variable Temp is repeatedly used by the microprograms shown in FIG. 6; hence, an execution time for one step should be long. For this reason, in order to increase the number 'n' of the series of musical tone signals, it is necessary to use a special multiplier whose processing speed is high but whose price is expensive.

Further, in order to carry out the processing on the 'n' series of signals in a time-division manner, a storage capacity for storing programs should be increased to 'n' times of the storage capacity to be required for the processing of only one series of signals. Thus, there is a problem that much storage capacity should be required.

SUMMARY OF THE INVENTION

It is an object of the present invention to provide a processing device which is capable of performing a plenty of operational processes with a small storage capacity, storing the programs, even if low-speed and inexpensive multipliers are used.

According to a fundamental configuration of the present invention, the processing device comprises a coefficient register, a microprogram memory, a delay memory and a processing portion. The coefficient register stores plural sets of coefficients, while the microprogram memory stores a plurality of programs each corresponding to one operational command or one instruction. The coefficient register is accessed by a first address signal so that a desired set of coefficients are sequentially read out. The microprogram memory is accessed by a second address signal so that a desired program is read out. The delay memory stores the results of the operational processes effected by the processing portion. Herein, the value of each of the first and second address signals is periodically changed in each sampling period.

In a writing operation of the delay memory, the processing portion effects the operational processes on a series of musical tone signals supplied thereto in accordance with the program which is repeatedly executed for the desired set of coefficients, so that output data of the processing portion are written into the delay memory. In a reading operation of the delay memory, the processing portion effects the operational processes on data read from the delay memory.

Since the same program (or same operational command) can be repeatedly executed with respect to plural sets of coefficients which are outputted from the coefficient register in turn, the pipeline processing can be effectively performed with a reduced storage capacity of the microprogram memory.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings:

FIG. 6 shows an example of microprograms simulating a certain filtering operation.

DESCRIPTION OF THE PREFERRED EMBODIMENT

[A] Configurations of the Embodiment

Figure 1:
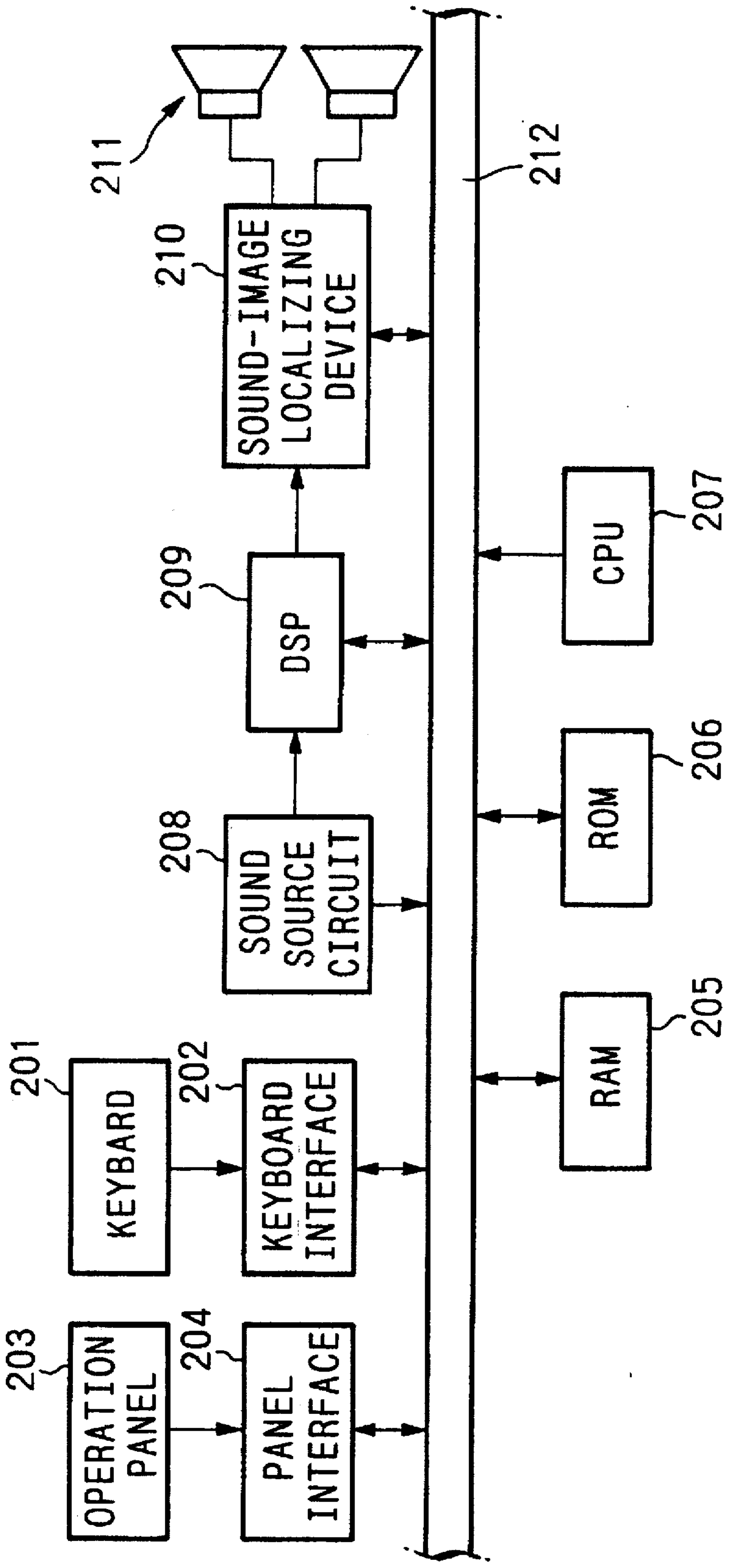
FIG. 1 is a block diagram showing a whole configuration of an electronic musical instrument employing a processing device according to an embodiment of the present invention.

FIG. 1 is a block diagram showing the whole configuration of the electronic musical instrument employing a processing device according to an embodiment of the present invention. In FIG. 1, a keyboard 201 provides a plurality of keys which are performed by a performer. Performance information, representing a musical performance which is made by performing the keys, is produced by the keyboard 201 and is transmitted onto a bus 212 through a keyboard interface 202. As similar to the electronic musical instrument conventionally known, the performance information contains a key-on signal KON, a key-off signal KOFF, a keycode KC and touch information IT. Herein, the key-on signal KON represents a key-depression event; the key-off signal KOFF represents a key-off event; the keycode KC represents a tone pitch of the key to be depressed; and the touch information IT represents an intensity of depressing the key, e.g., an initial touch.

A central processing unit (i.e., CPU) 207 is provided to control several portions of the electronic musical instruments on the basis of several kinds of programs which are stored in a read-only memory (i.e., ROM) 206. This ROM 206 stores a plurality of control programs as well as several kinds of data and tables, some of which are used when performing a specific processing. On a panel face of an operation panel 203, there are provided several kinds of switches and display screens. Hence, the performer uses this operation panel 203 to enter several kinds of data for the CPU 207 through a panel interface 204 and the bus 212.

The CPU 207 can access a random-access memory (i.e., RAM) 205 to perform data-reading/writing operations. A numeral 208 denotes a sound source circuit, to which the CPU 207 sends a set of data, representing the tone pitch, envelope, tone color and the like, through the bus 212. When receiving those data, the sound source circuit 208 produces a musical tone signal based on those data. As similar to the sound source provided in the electronic musical instrument conventionally known, the sound source circuit 208 provides a plurality of tone-generation channels. Herein, every time a key of the keyboard 201 is newly depressed, a tone-generation task for the depressed key is assigned to one of the tone-generation channels. Thus, the sound source circuit 208 can simultaneously produce a plurality of musical tone signals by using the plural tone-generation channels.

A numeral 209 denotes a 'DSP' which is provided to effect a specific filtering operation on each of the musical tone signals produced from the tone-generation channels of the sound source circuit 208. Then, the musical tone signals, which are processed by the DSP 209, are supplied to a sound system 211 through a sound-image localizing device 210, so that the musical tones are produced by the sound system 211.

Figure 5:
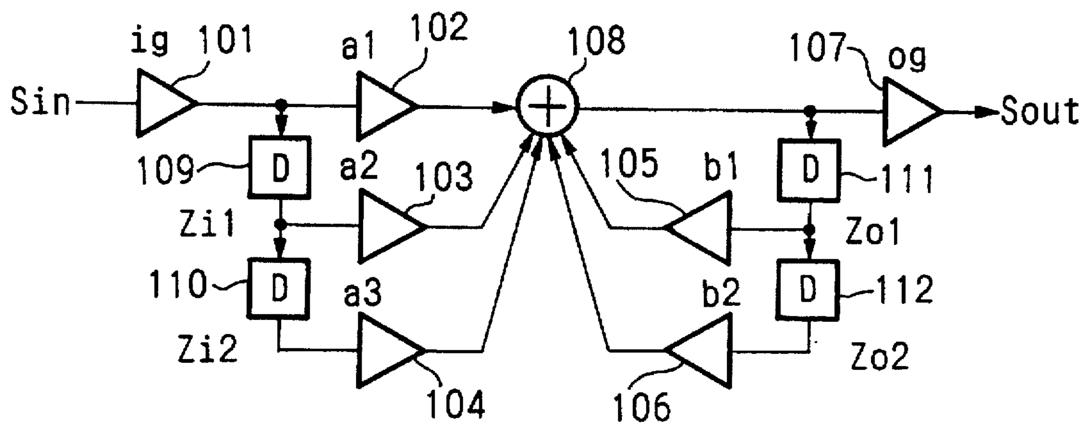
FIG. 5 is a block diagram showing an example of the digital filter.

Next, an electronic configuration of the DSP 209 will be described in detail by referring to FIG. 2. This DSP 209 is designed such that the specific filtering operation, which is equivalent to the digital filter shown in FIG. 5, is performed on the 'n' series of musical tone signals by using different coefficients.

Figure 2:
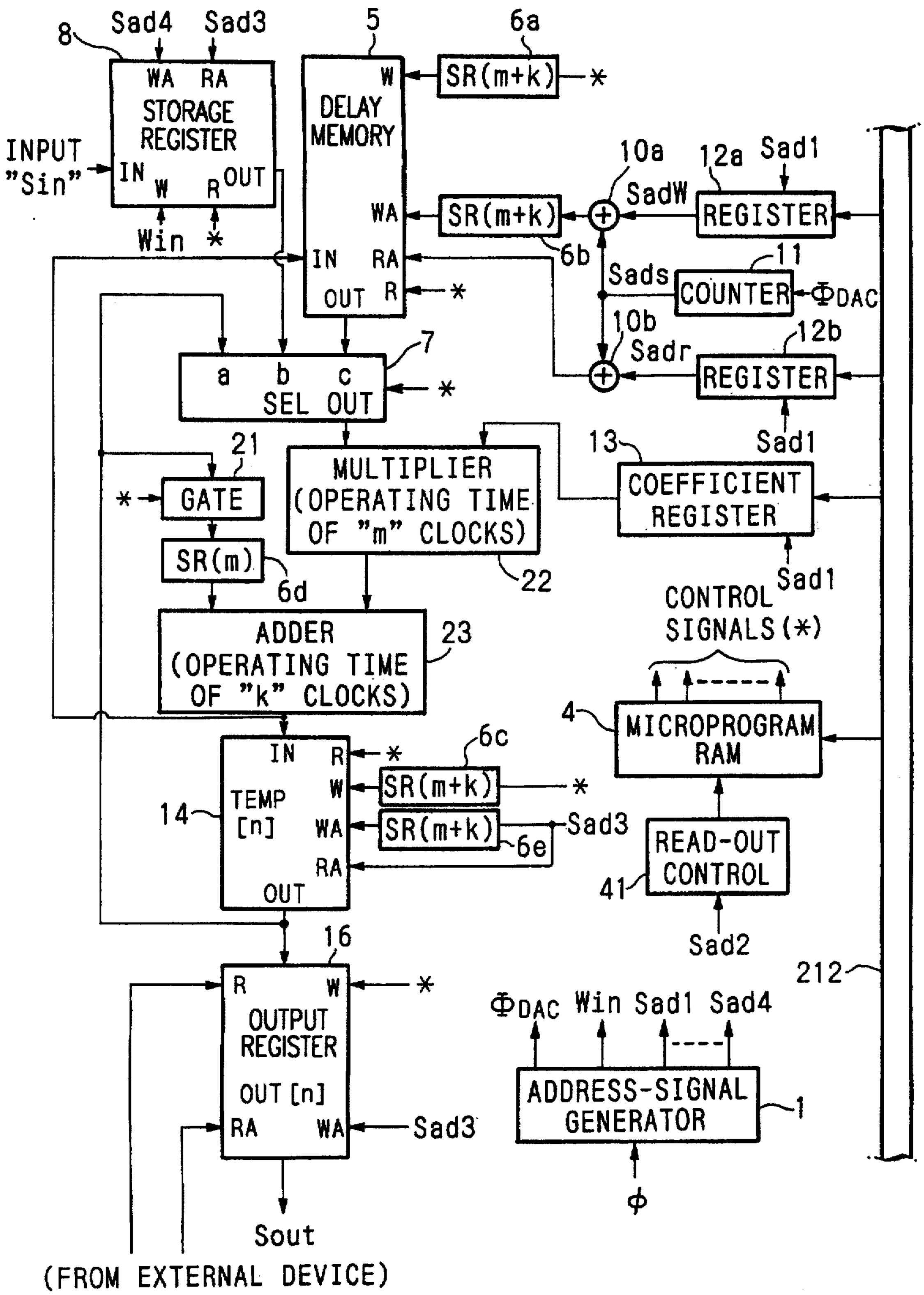
FIG. 2 is a block diagram showing a main part of the processing device.
Figure 3:
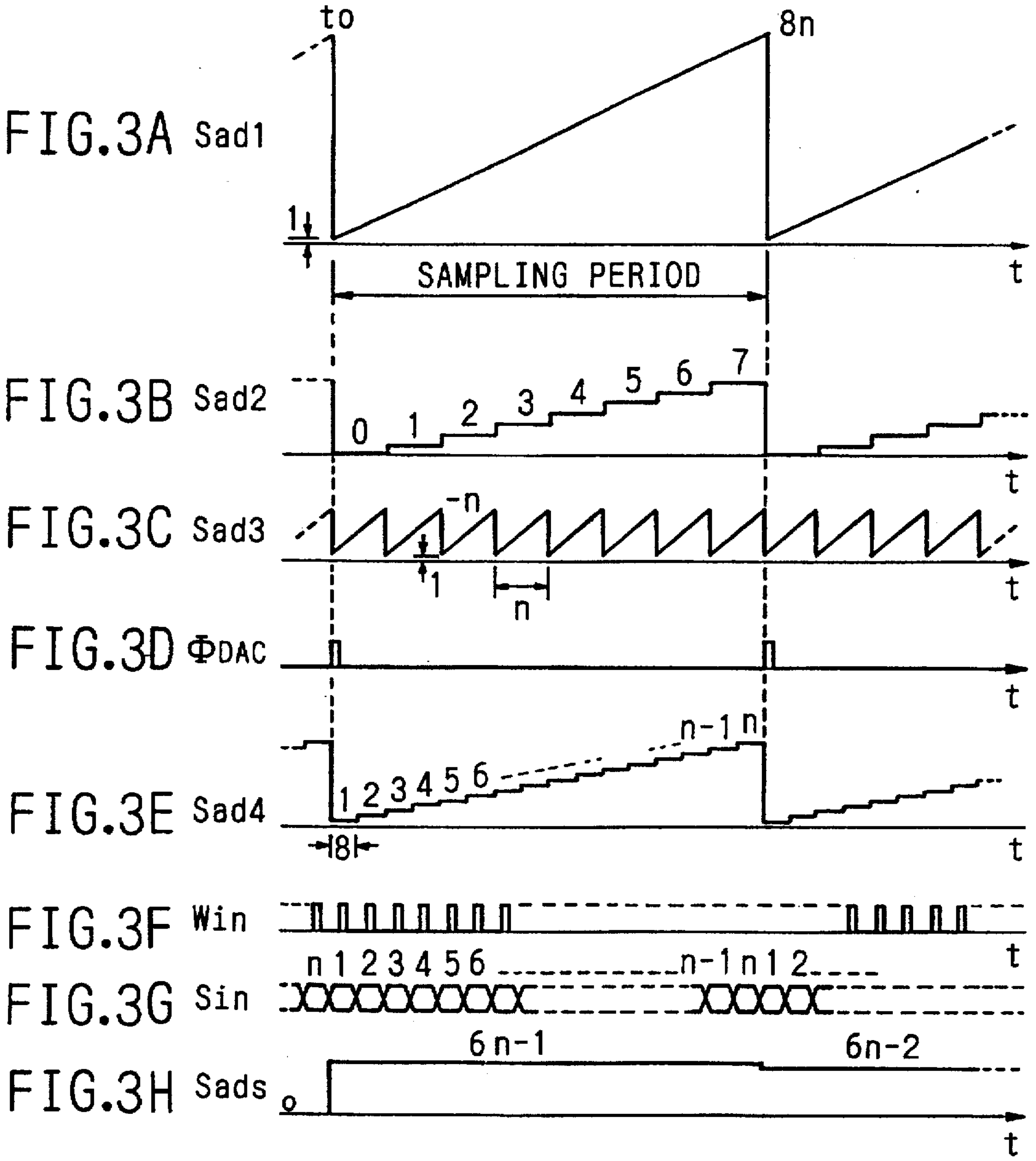
FIGS. 3A to 3H are graphs showing waveforms of signals used in the processing device shown in FIG. 2.
Figure 4:
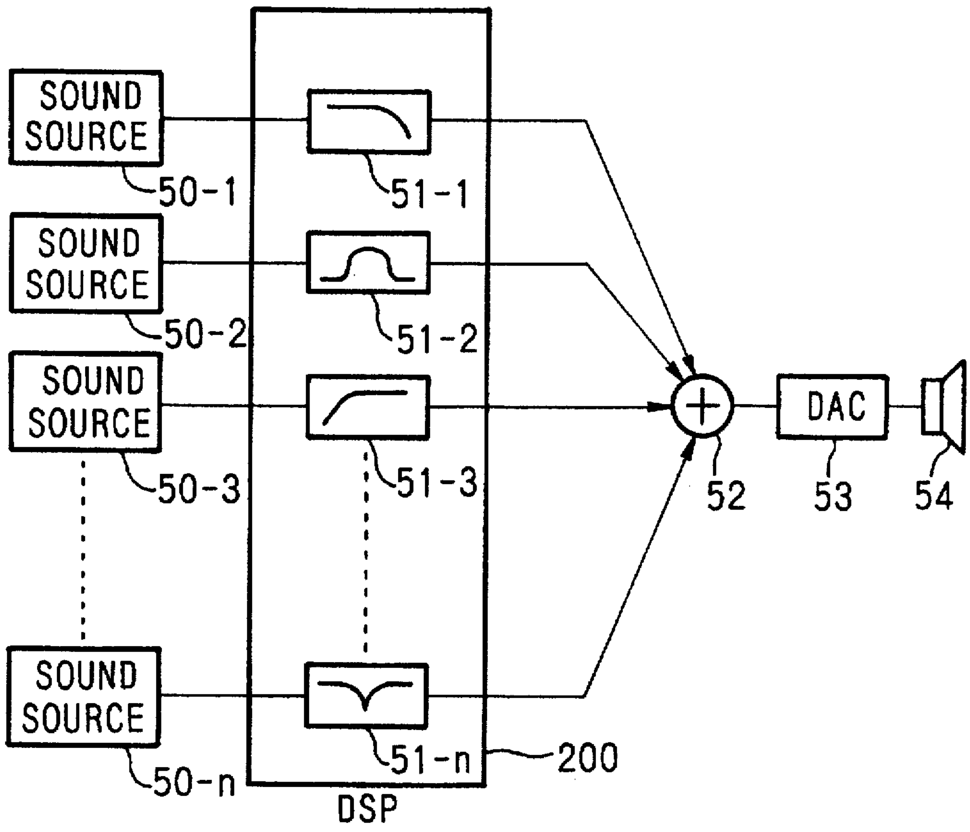
FIG. 4 is a block diagram showing an example of the electronic musical instrument conventionally known.

In FIG. 2, a numeral 1 denotes an address-signal generator which generates signals, as shown by FIGS. 3A to 3H, in synchronism with a clock signal $\phi$ whose period is determined in advance. An address signal Sad1 (see FIG. 3A) is a sawtooth signal, the level of which is incremented by each period of the clock signal $\phi$ within a range between a level '1' and a level '8n' (where n is an integral number which is larger than '1'). An address signal Sad2 (see FIG. 3B) is a step-like signal, the level of which is incremented by each duration corresponding to the 'n' periods of the clock signal $\phi$ within a range between a level '0' and a level '7'. As shown in FIGS. 3A and 3B, the same period is set for both of the address signals Sad1 and Sad2.

An address signal Sad3 (see FIG. 3C) is a sawtooth signal, the level of which is incremented by each duration corresponding to a certain number of periods of the clock signal $\phi$ within a range between a level '1' and a level 'n'. An address signal Sad4 (see FIG. 3E) a step-like signal, the level of which is incremented by each duration corresponding to eight periods of the clock signal $\phi$ within a range between the level '1' and the level 'n'. An input-data write signal Win (see FIG. 3F) is a pulse train in which each pulse rises in synchronism with each step of the address signal Sad4.

The above-mentioned number 'n' represents a number of the pipeline processes which can be executed by the processing device according to the present embodiment. Thus, the present embodiment can eventually effect the filtering operation, which is equivalent to the digital filter shown in FIG. 5, on the 'n' series of musical tone signals in turn. The details of the operations of the present embodiment will be described later. In the meantime, the period of the address signal Sad1 is set equal to the 'Sn' periods of the clock signal $\phi$. This period of the address signal Sad1 is equal to the sampling period for the digital processing to be effected on the musical tone signal. The address-signal generator 1 also produces a sampling-clock signal $\phi_{DAC}$ (see FIG. 3D) in which each leading edge appears in each sampling period as shown in FIG. 3D.

In FIG. 2, a numeral 4 denotes a microprogram RAM having a storage capacity which can store eight words of data at once. This microprogram RAM 4 stores the microprograms, the contents of which will be described later, in a storage area ranging from an address 0 to an address 7. A read-out control circuit 41 is capable of accessing the microprogram RAM 4 at the certain address indicated by the address signal Sad2, the value of which ranges from '0' to '7'. Microprogram codes read from the microprogram RAM 4 are supplied to selectors and gates so that their operations are controlled. In the present specification, "one word" corresponds to a predetermined number of bits, e.g., sixteen bits.

Address registers 12*a* and 12*b* respectively store address signals 'Sadw' and 'Sadr' in connection with the address signal Sad1. When receiving the address signal Sad1, the address registers 12*a* and 12*b* output the address signals Sadw and Sadr respectively. A relationship established among the address signals Sad1, Sadw and Sadr is shown in a Table 1.

TABLE 1

| Sad1 | Sadw | Sadr |
|---|---|---|
| 1 ~ n | 0,6,12,18, ...,6(n−1) | — |
| n+1 ~ 2n | — | — |
| 2n+1 ~ 3n | — | 1,7,13,19,25,...,6n−5 |
| 3n+1 ~ 4n | — | 2,8,14,20,26,...,6n−4 |
| 4n+1 ~ 5n | — | 4,10,16,22,28,...,6n−2 |
| 5n+1 ~ 6n | 3,9,15,21,...,6n−3 | 5,11,17,23,29,...,6n−1 |
| 6n+1 ~ 7n | — | — |
| 7n+1 ~ 8 | — | — |

TABLE 2

| Address (Sad1) | Written Contents |
|---|---|
| 1 ~ n | coefficients ig[1], ig[2], ..., ig[n] |
| n+1 ~ 2n | coefficients a1[1], a1[2], ..., a1[n] |
| 2n+1 ~ 3n | coefficients a2[1], a2[2], ..., a2[n] |
| 3n+1 ~ 4n | coefficients a3[1], a3[2], ..., a3[n] |
| 4n+1 ~ 5n | coefficients b1[1], b1[2], ..., b1[n] |
| 5n+1 ~ 6n | coefficients b2[1], b2[2], ..., b2[n] |
| 6n+1 ~ 7n | coefficients og[1], og[2], ..., og[n] |
| 7n+1 ~ 8n | — |

In the Table 1, each portion described with a symbol "—" is meaningless for the present embodiment and is not related to the operations of the present embodiment; hence, values for such portion are not described. Incidentally, the contents of the Table 1 can be adequately changed under the control of the CPU 207 (see FIG. 1).

In FIG. 2, a numeral 13 denotes a coefficient register, which when receiving the address signal Sad1, outputs certain data designated by that address signal. This coefficient register 13 is connected with the CPU 207 through the bus 212 (see FIG. 1). Therefore, it is possible to adequately change the written contents of the coefficient register 13.

The coefficient register 13 stores several kinds of parameters which are required for determining the filtering characteristic. More specifically, the coefficient register 13 stores a set of the coefficients ig, a1, a2, a3, b1, b2 and og (which are used in the digital filter shown in FIG. 5) with respect to each of the 'n' series of musical tone signals. In the present specification, a symbol of each parameter is added with a series number in parentheses "[ ]". For example, the parameter 'ig' used for a series number '1' is expressed as 'ig[1]'; the parameter 'ig' for a series number '2' is expressed as 'ig[2]'; and, the parameter 'ig' for a series number 'n' is expressed as 'ig[n]'. The coefficient register 13 provides addresses '1' to '8n', by which the parameters are stored as shown in a Table 2. The Table 2 shows a memory map for the coefficient register 13.

Next, a numeral 5 denotes a delay memory, which is configured by a dual-port RAM having addresses '0' to '6n−1'. The delay memory 5 provides two pairs of address line and data line. Hence, it is possible to perform a reading operation simultaneously with performing a writing operation. When the reading and writing operations are simultaneously performed with respect to the same address of the delay memory 5, the writing operation is performed first prior to the reading operation. In this case, after the writing operation is completed, the reading operation is started. For this reason, the data currently read from the delay memory 5 coincides with the data which have been written into the delay memory 5 just before the current reading operation is performed.

The commands which designate the reading or writing operation for the delay memory 5 are outputted from the microprogram RAM 4. More specifically, within the output data of the microprogram RAM 4, a predetermined bit is used as a reading command R and is supplied to the delay memory 5. Another bit within the output data of the microprogram RAM 4 is used as a writing command W and is supplied to the delay memory 5 through a delay circuit 6*a*. Incidentally, each of the other portions of the circuitry shown in FIG. 2 is controlled by a certain bit within the output data of the microprogram RAM 4.

A numeral 7 denotes a selector having three input terminals 'a', 'b' and 'c'. One of three input data is selected in accordance with the command given from the microprogram RAM 4.

A multiplier 22 multiplies output data of the selector 7 by output data of the coefficient register 13 so as to produce a result of multiplication. This multiplier 22 is designed based on a pipeline-processing system. Hence, before the multiplication is completed with respect to first data which is firstly inputted into the multiplier 22, the multiplier 22 can input second data which is inputted thereto next to the first data. The multiplier 22 requires a certain period of time corresponding to 'm' clocks in order to obtain the result of multiplication after inputting the data. An adder 23 is designed based on the pipeline-processing system. This adder 23 adds output data of the multiplier 22 with output data of a delay circuit 6*d* so as to produce a result of addition. The adder 23 requires a certain period of time corresponding to 'k' clocks in order to obtain a result of addition after inputting the data. Incidentally, the above-mentioned numbers 'm' and 'k' are integral numbers.

Next, an address counter 11 is provided to output an address signal Sads in synchronism with the sampling clock $\phi_{DAC}$. Herein, the address signal Sads is a signal, the level of which is decremented by each leading-edge timing of the sampling clock $\phi_{DAC}$ in a range from '6n−1' to '0' as shown in FIG. 3H. After the address signal Sads is decremented to '0', the level of the address signal Sads is increased to '6n−1' at the next leading-edge timing of the sampling clock $\phi_{DAC}$. Therefore, the period of the address signal Sads is six times of the sampling period.

An adder 10*a* adds the address signals Sadw and Sads together, while an adder 10*b* adds the address signals Sadr and Sads together. A result of addition of the adder 10*b* is supplied to the delay memory 5 as a reading address RA. On the other hand, a result of addition of the adder 10*a* is supplied to the delay memory 5 through a delay circuit 6*b* as a writing address WA. Incidentally, the reading address RA and the writing address WA are limited not to be greater than the value '6n−1'. When each of those addresses exceeds the value '6n−1', a certain value is automatically calculated for each of those addresses. According to this calculation, the value of the address (RA or WA) is divided by '6n' so as to obtain a remainder, which is used as the above certain value.

Each of the delay circuits 6*a* and 6*b* is configured by a shift register having 'm+k' stages (or shift positions). In the shift register, an input signal is shifted by each stage in synchronism with the clock signal φ. Thus, a signal overflown from the shift register is outputted. A delay time set for each of the delay circuits 6*a* and 6*b* is equal to a sum of calculation times required for the multiplier 22 and the adder 23.

When the microprogram RAM 4 outputs the reading command for the delay memory 5, certain data is immediately read from the delay memory 5 on the basis of the reading address RA, so that the read data is supplied to the selector 7. On the other hand, when the microprogram RAM 4 outputs the writing command for the delay memory 5, this writing command is delayed in the delay circuit 6*a* by a delay time corresponding to the 'm+k' clocks, while the writing address WA is also delayed in the delay circuit 6*b* by the same delay time. Thus, the writing operation is performed on the delay memory 5 when the delay time corresponding to the 'm+k' clocks has passed after the microprogram RAM 4 outputs the writing command. Incidentally, the contents of data to be written into the delay memory 5 is the result of addition produced by the adder 23.

Next, a numeral 8 denotes a register having a storage capacity which can store 'n' words of data. As similar to the aforementioned delay memory 5, this register 8 is configured by the dual-port RAM. As described before, the sound source circuit 208 creates the 'n' series of musical tone data, which are sequentially supplied to an input terminal of the register 8 in a time-division manner in accordance with timings as shown in FIG. 3G. Incidentally, each series of musical tone data (i.e., input signals to the register 8) is represented by a symbol 'Sin[k]' (where k=1, 2, . . . n). The input signal is written at the address, designated by the address signal Sad4, in the register 8 by the timing designated by the writing signal Win.

A temporary memory 14 has a storage capacity which can store the 'n' words of data. This temporary memory 14 temporarily stores the result of addition given from the adder 23 on the basis of the address signal Sad3 and the control signal outputted from the microprogram RAM 4. A gate circuit 21 is turned on or off by the control signal outputted from the microprogram RAM 4. When being set in an 'on' state, the gate circuit 21 transmits output data of the temporary memory 14 to the delay circuit 6*d*. In an 'off' state, the gate circuit 21 supplies data '0' to the delay circuit 6*d*.

An output register 16 has a storage capacity which can store the 'n' words of data. This output register 16 stores the output data of the temporary memory 14 on the basis of the address signal Sad3 and the control signal outputted from the microprogram RAM 4. Each of the above-mentioned temporary memory 14 and the output register 16 is configured by the dual-port RAM which is similar to the delay memory 5. Incidentally, the data stored in the output register 16 can be read out by the aforementioned sound-image localizing device 210 (see FIG. 1). Numerals 6*c* and 6*e* denote delay circuits. Herein, the delay circuit 6*c* delays the control signal outputted from the microprogram RAM 4 by the 'm+k' clocks, while the delay circuit 6*e* delays the address signal Sad3 by the 'm+k' clocks. Then, the delayed control signal and the address signal Sad3 delayed are supplied to the temporary memory 14.

[B]Operations of the Embodiment

Next, the operations of the present embodiment will be described in detail.

Under the control of the CPU 207 (see FIG. 1), predetermined programs are written respectively at the addresses 0 to 7 of the microprogram RAM 4. The contents of the programs to be written at each address of the microprogram RAM 4 are described in a Table 3. The Table 3 shows a memory map for the microprogram RAM 4.

Now, the operations of the present embodiment will be described in turn with respect to each of value ranges of the address signal Sad1, wherein as shown in FIG. 3A, the value of the address signal Sad1 is increased from '1' to '8n' within one sampling period.

TABLE 3

| Address (Sad2) | Contents of commands and instructions |
|---|---|
| 0 | INR: read out data from the register 8.<br>SEL b: select the input terminal 'b' of the selector 7.<br>TW: write data into the temporary memory 14.<br>ZW: write data into the delay memory 5.<br>G off: turn off the gate circuit 21. |
| 1 | TR: read out data from the temporary memory 14.<br>SEL a: select the input terminal 'a' of the selector 7.<br>TW: write data into the temporary memory 14.<br>G off: turn off the gate circuit 21. |
| 2 | ZR: read out data from the delay memory 5.<br>SEL c: select the input terminal 'c' of the selector 7.<br>TR: read out data from the temporary memory 14.<br>G on: turn on the gate circuit 21.<br>TW: write data into the temporary memory 14. |
| 3 | (Same contents of address '2') |
| 4 | (Same contents of address '2') |
| 5 | ZR: read out data from the delay memory 5.<br>SEL c: select the input terminal 'c' of the selector 7.<br>TR: read out data from the temporary memory 14.<br>G on: turn on the gate circuit 21.<br>TW: write data into the temporary memory 14.<br>ZW: write data into the delay memory 5. |
| 6 | TR: read out data from the temporary memory 14.<br>G off: turn off the gate circuit 21.<br>*TW: write data into the temporary memory 14.<br>SEL a: select the input terminal 'a' of the selector 7. |
| 7 | TR: read out data from the temporary memory 14.<br>OW: write data into the output register 16. |

(a) First State Where the Address Signal Sad1 is Set at '1'.

At a moment t0, the address signal Sad1 is set at '1', while the address signal Sad2 is set at '0'. The aforementioned Table 2 describes that when the address signal Sad1 is set at '1', the coefficient ig[1] is read from the coefficient register 13. The Table 3 describes that when the address signal Sad2 is set at '0', the selector 7 selects the input terminal 'b' in accordance with the command "SEL b", while the gate circuit 21 is turned off in accordance with the command "G off".

In accordance with the command "INR", the musical tone data is read from the register 8. At this time, the address signal Sad3 supplied to the register 8 is set at '1', so that the data Sin[1] is supplied to the multiplier 22 through the selector 7. Thus, the multiplier 22 starts the multiplication using the coefficient ig[1] and the data Sin[1]. As described before, the command "G off" initiates the gate circuit 21 to be in the 'off' state, so that the gate circuit 21 outputs a '0' signal to the delay circuit 6d. Due to the commands "TR" and "ZW", a '1' signal, designating a reading operation, is delivered to both of the delay circuits 6a and 6c.

The aforementioned Table 1 describes that when the address signal Sad1 is at '1', the address signal Sadw is set at '0'. At that time, if the address signal Sads is at '6n−1' as shown in FIG. 3H, the adder 10a produces a result of addition '6n−1', which is then supplied to the delay circuit 6b. Incidentally, the delay circuit 6e receives the address signal Sad3.

(b) Second State Where the Address Signal Sad1 is Set Within a Range Between '2' and 'n'

In the second state, the address signal Sad1 is incremented within the range between '2' and 'n'; and this address signal Sad1 incremented is used to access the coefficient register 13. Thus, as described in the Table 2, the coefficients ig[2] to ig[n] are sequentially read from the coefficient register 13 and are sequentially supplied to the multiplier 22. On the other hand, the address signal Sad3 is also incremented within the range between '2' and 'n'; and this address signal Sad3 incremented is used to access the register 8. Thus, the data Sin[2] to Sin[n] are sequentially read from the register 8 and are sequentially supplied to the selector 7. Incidentally, the above address signal Sad3 is also supplied to the delay circuit 6e.

In the second state described above, the address signal Sad2 is remained at '2'. In this period of time, the input terminal b is continuously selected by the selector 7, while the gate circuit 21 is continuously set in the 'off' state. Therefore, the multiplier 22 sequentially produces results of multiplication such as 'ig[2]×Sin[2]', . . . , 'ig[n]×Sin[n]'. In this state, the '0' signal is continuously supplied to the delay circuit 6d.

The aforementioned Table 1 describes that while the address signal Sad1 is incremented within the range between '2' and 'n', the address signal Sadw is correspondingly changed in an order of '6', '12', . . . , '6(n−1)', whereas the address signal Sads is remained at '6n−1'. Thus, the signal supplied to the delay circuit 6b is changed in an order of '(6n−1)+6', '(6n−1)+12', . . . , '(6n−1)+6(n−1)'. In this case, the output signal of the delay circuit 6b exceeds the aforementioned limit value '6n−1'. Hence, the writing address WA supplied to the delay memory 5 is subjected to the predetermined calculation, in which the value is divided by '6n' so as to produce the remainder. This remainder is eventually used as the writing address WA for the delay memory 5. Thus, the writing address WA is changed in an order to '5', '11', '17', . . . , '6n−1'.

Meanwhile, at a time when the address signal Sad1 is set at '1', the multiplier 22 starts the calculation of 'ig[1]×Sin [1]', while the '0' signal is supplied to the delay circuit 6d. The multiplier 22 completes the calculation of 'ig[1]×Sin[1]' when the certain period of time corresponding to the 'm' clocks has passed after the above-mentioned time. Then, the result of multiplication is supplied to the adder 23. On the other hand, the '0' signal is delayed by the delay time corresponding to the 'm' clocks; and then, the delayed '0' signal is supplied to the adder 23 at the same time when the result of multiplication is supplied to the adder 23.

Thereafter, when a certain period of time corresponding to the 'k' clocks is passed, the adder 23 outputs a result of addition, represented by a mathematical formula to read "ig[1]×Sin[1]+0" (=ig[1]×Sin[1]). The result of addition is delivered to the temporary memory 14 and the delay memory 5. At a previous timing, the '1' signal has been supplied to the delay circuit 6a and 6c. Hence, the delayed '1' signals respectively outputted from the delay circuits 6a and 6c are respectively supplied to the delay memory 5 and the temporary memory 14 at the time when the result of addition is supplied to them. Thus, the delay memory 5 and the temporary memory 14 are set in a write enable state.

The delay circuits 6b and 6e output the respective address signals inputted thereto when the address signal Sad1 is at '1'. More specifically, the delay circuit 6b outputs the address signal '5', so that the result of addition "0+ig[1]×Sin[1]" is written at an address '5' of the delay memory 5. On the other hand, this result of addition is also written at an address 1 of the temporary memory 14.

In a duration where the address signal Sad1 is changed within the range between '2' and 'n', the adder 23 performs the addition based on the input data of the multiplier 22 and gate circuit 21, so that the result of addition to be outputted from the adder 23 is changed in an order of "ig[2]×Sin[2]", "ig[3]×Sin[3]", . . . , "ig[n]×Sin[n]". Those results of addition are written in the temporary memory 14 at the addresses 2, 3, . . . , n respectively, while they are also written in the delay memory 5 at the addresses 5, 11, 17, . . . , 6n−1respectively.

(c) Third State Where the Address Signal Sad1 is set at 'n+1'

When the address signal Sad1 becomes equal to 'n+1', the address signal Sad2 is set at '1' (see FIG. 3B). Therefore, the address 1 of the microprogram RAM 4 is accessed, so that the selector 7 selects the input terminal 'a', while the gate circuit 21 is still remained in the 'off' state. In this state, the commands "TW" and "TR" are provided for the temporary memory 14. As described before, the '1' signal based on the command TW is supplied to the temporary memory 14 through the delay circuit 6c. On the other hand, the command TR, representing the read-out instruction, is directly supplied to the temporary memory 14.

Incidentally, the temporary memory 14 receives the address signal Sad3 as the reading address RA. At this time, the address signal Sad3 is set at '1'. Hence, the date written at the address 1 of the temporary memory 14 is read out; in other words, the result of the calculation "0+ig[1]×Sin[1]", which has been previously computed, is read from the temporary memory 14. Such data previously computed is supplied to the multiplier 22 through the input terminal 'a' of the selector 7.

In order to achieve the above-mentioned operations, the sum of the numbers of the clocks which are required for the operations of the multiplier 22 and the adder 23 respectively should be determined under a certain condition which is described by an inequality "n≧k+m". If a condition "n>k+m" is satisfied, it is possible to store the result of the calculation "0+ig[1]+Sin[1]" in the temporary memory 14 before the address signal Sad1 becomes equal to 'n+1'. On the other hand, if a condition "n=k+m" is satisfied, the writing operation for the temporary memory 14 is designated by the output data of the delay circuit 6c, while the reading operation for the temporary memory 14 is designated by the address signal Sad3 and the output data of the microprogram RAM 4.

As described before, when a request for the reading operation and a request for the writing operation are simultaneously occurred for the temporary memory 14, the writing operation is executed firstly. Thus, in this case, the result of calculation is once written into the temporary memory 14, but is immediately read from the temporary memory 14. Then, the read data is delivered to the multiplier 22 through the selector 7. In the following description, the contents of the data stored at the addresses 1 to n in the temporary memory 14 are respectively expressed by symbols 'Temp [1]', 'Temp[2]', . . . , 'Temp[n]', each of which is called a "variable".

Incidentally, the foregoing Table 2 shows that when the address signal Sad1 is set at 'n+1', the coefficient a1[1] is read from the coefficient register 13 and is supplied to the multiplier 22. Thus, the multiplier 22 starts the multiplication "Temp[1]×a1[1]". In addition, the gate circuit 22 is set in the 'off' state, so that the '0' signal is supplied to the delay circuit 24.

(d) Forth State Where the Address Signal Sad1 is Set Within a Range Between 'n+2' and '2n'

Every time the address signal Sad1 is incremented by '1' within a range between 'n+2' and '2n', each of the variables Temp[2] to Temp[n] is read from the temporary memory 14; in other words, each of the results of the calculations "0+ig[2]×Sin[2]" to "0+ig[n]×Sin[n]" is read from the temporary memory 14. In the duration where the address signal Sad1 is set within the above-mentioned range, the address signal Sad2 is retained at '1', so that the aforementioned operations are carried out.

More specifically, the variables Temp[2] to Temp[n] are sequentially supplied to the multiplier 22 through the selector 7, while the coefficients a1[2] to a1[n] are sequentially read from the coefficient register 13 and are sequentially supplied to the multiplier 22. Thus, the multiplier 22 starts to perform the multiplications "Temp[2]×a1[2]" to "Temp [n]×a1[n]" in turn. When the period of time corresponding to the 'm+k' clocks is passed after the multiplication is started, the adder 23 outputs the aforementioned result of calculation. At this time, the '1' signal designating the writing operation is outputted from the delay circuit 6c, while the delayed address signal Sad3 is outputted from the delay circuit 6e. Thus, in the temporary memory 14, each of the variables Temp[1] to Temp[n] is renewed on the basis of the result of calculation newly produced.

(e) Fifth State Where the Address Signal Sad1 is Set at '2n+1'

When the address signal Sad1 becomes equal to '2n+1', the address signal Sad2 is set at '2' (see FIG. 3B). Thus, the address 2 of the microprogram RAM4 is accessed. In this case, when the command ZR is executed, the data is read from the delay memory 5. Herein, the reading address RA, which is set when the command ZR is executed, is equal to the sum of the values of the address signals Sads and Sadr. FIG. 3H shows that the address signal Sads is set at '6n−1', while the aforementioned Table 1 shows that the address signal Sadr is set at '1'. Hence, the sum of those values is equal to '6n'. In this case, however, the reading address RA exceeds the limit value '6n−1'. Therefore, the aforementioned computation is performed to calculate a remainder which is obtained by dividing the reading address RA by the value '6n'. Since the reading address RA is currently set at '6n', the remainder is equal to '0'. Thus, the address 0 of the delay memory 5 is accessed.

The address 0 of the delay memory 5 stores the result of the calculation "ig[1]×Sin[1]" in connection with the data Sin[1] which has been previously applied to the register 8 at a previous period which is one sampling period before the current period. This result of calculation corresponds to data "Zi1[1]" used in the digital filter shown in FIG. 5. In the current sampling period, the writing address WA, which is inputted into the delay circuit 6b when the address signal Sad1 is at '1', is equal to '6n−1'. This value '6n−1' is the sum of the values of the address signals Sads and Sadw because the aforementioned Table 1 shows that the address signal Sads is equal to '6n−1' while the address signal Sadw is equal to '0'.

In the previous sampling period which is one sampling period before the current sampling period, the same operations have been carried out as well. However, different from the current sampling period, the address signal Sads is equal to '0' (see FIG. 3H) in the previous sampling period. Therefore, in the previous sampling period, the value of the writing address WA to be supplied to the delay circuit 6b is described by an equation "0+0=0". This proves that the result of the calculation "ig[1]×Sin[1]" is stored at the address 0 of the delay memory 8.

The data "Zi1[1]" outputted from the delay memory 5 is supplied to the input terminal 'c' of the selector 7. At this stage, the aforementioned command "SEL c" is carried out, so that the output data of the delay memory 5 is supplied to the multiplier 22 through the selector 7. On the other hand, the coefficient a2[1] is read from the coefficient register 13 in accordance with the address signal Sad1 which is now set at '2n+1', so that this coefficient is supplied to the multiplier 22. Hence, the multiplier 22 starts the multiplication "Zi1 [1]×a2[1]".

The aforementioned Table 3 shows that when the address signal Sad2 is set at '2', the command TR is executed so that the data is read from the temporary memory 14. The reading address used for the temporary memory 14 is determined by the address signal Sad3 which is now set at '1'. At the same time when the command TR is executed, another command "G on" is also executed. Therefore, the variable Temp[1], i.e., the result of the calculation "ig[1]×Sin[1]", is outputted from the temporary memory 14. Then, the output data is supplied to the delay circuit 6d through the gate circuit 21. At this time, the '1' signal is produced in accordance with the command TW and is supplied to the delay circuit 6c, while the address signal Sad3 is supplied to the delay circuit 6e.

When the period of time corresponding to the 'm' clocks has passed after the above-mentioned circuits receive their signals, the multiplier 22 outputs a result of a multiplication "Zi1[1]×a2[1]", while the delay circuit 6d outputs the variable Temp[1]. Thereafter, when the period of time corresponding to the 'k' clocks is passed, the adder 23 outputs a result of a calculation "Zi1[1]×a2[1]+Temp[1]", so that this result of calculation is stored in the temporary memory 14 as a renewed variable Temp[1].

(f) Sixth State Where the Address Signal Sad1 is Set Within a Range Between '2n+2' and '3n'

Every time the address signal Sad1 is incremented by '1' within the range between '2n+2' and '3n', the address signal Sadr is set at '7', '13', . . . , '6n−5' in turn. Correspondingly, the addresses 6, 12, . . . , and (6n−4) of the delay memory 5 are accessed in turn, so that the data Zi1[2], Zi1[3], . . . , and Zi1[n] are sequentially supplied to the multiplier 22 through the selector 7. On the other hand, the coefficients a2[2], a2[3], . . . , and a2[n] are sequentially read from the coefficient register 13, while the variables Temp[2], . . . , Temp[n] are sequentially supplied to the delay circuit 6d through the gate circuit 21. Therefore, when the period of time corresponding to the 'm+k' clocks is passed, the variables Temp[2] to Temp[n] are sequentially and respectively renewed by results of calculations "Zi1[2]×a2[2]+Temp[2]" to "Zi1[n]×a2[n]+Temp[n]".

(g) Seventh State Where the Address Signal Sad1 is Set Within a Range Between '3n+1' and '4n'

When the address signal Sad1 reaches the value '3n+1', the address signal Sad2 is set at '3' (see FIG. B). In this state, the control signals outputted from the microprogram RAM 4 are identical to the control signals which are set in the aforementioned sixth state where the address signal Sad1 is set within the range between '2n+1' and '3n'.

However, different from the aforementioned sixth state, the coefficients a3[1] to a3[n] are read from the coefficient register 13, while the address signal Sadr is set at '2', '8', '14', . . . , '6n–4' in turn. The adder 10b adds the address signal Sadr to the address signal Sads which is currently set at '6n–1'. As a result, the reading address RA for the delay memory 5 is set at '1', '7', . . . , '6n–5' in turn. The results of the calculations "ig[1]×Sin[1]" to "ig[n]×Sin[n]", which have been emerged two sampling periods before the current sampling period, are respectively stored at the addresses 1, 7, . . . , 6n–5 in the delay memory 5. The above-mentioned results of calculations respectively correspond to the data Zi2[1] to Zi2[n] used in the digital filter shown in FIG. 5. Therefore, when the period of time corresponding to the 'm+k' clocks is passed, the variables Temp[1] to Temp[n] are sequentially and respectively renewed by results of calculations "Zi2[1]×a3[1]+Temp[1]" to "Zi2[n]×a3[n]+Temp[n]"; and then, the renewed variables are stored in the temporary memory 14.

(h) Eighth State Where the Address Signal Sad1 is Set Within a Range Between '4n+1' and '5n'

In the eighth state where the address signal Sad1 is set within the range between '4n+1' and '5n', the address signal Sad2 is set at '4'. In this state, the control signals outputted from the microprogram RAM 4 are identical to the control signals which are used in the aforementioned sixth state where the address signal Sad1 is set within the range between '2n+1' and '3n'.

However, different from the sixth state, the coefficients b1[1] to b1[n] are read from the coefficient register 13, while the address signal Sadr is set at '4', '10', '16', . . . , '6n–2' in turn. The adder 10b adds the address signals Sadr and Sads together, wherein the address signal Sads is set at '6n–1'. Hence, the delay memory 5 is accessed at the addresses 3, 9, . . . , 6n–3 in turn. Incidentally, the data Zo1[1] to Zo1[n] are respectively stored at those addresses of the delay memory 5, whereas the reason why those data are stored at those addresses will be described later.

Therefore, when the period of time corresponding to the 'm+k' clocks is passed, the variables Temp[1] to Temp[n] are sequentially and respectively renewed by results of calculations "Zo1[1]×b1[1]+Temp[1]" to "Zo1[n]×b1[n]+Temp[n]".

(i) Ninth State Where the Address Signal Sad1 is Set Within a Range Between '5n+1' to '6n'

In the ninth state where the address signal Sad1 is set within the range between '5n+1' to '6n', the address signal Sads is set at '5'. In this state, the control signals outputted from the microprogram RAM 4 are identical to the control signals used in the aforementioned sixth state where the address signal Sad1 is set within the range between '2n+1' to '3n', whereas the ninth state uses the command ZW other than the commands used in the sixth state.

In the ninth state, the coefficients b2[1] to b2[n] are read from the coefficient register 13, while the address signal Sadr is set at '5', '11', '17', . . . , '6n–1' in turn. The adder 10b adds the address signals Sadr and Sads (where Sads='6n–1') together, so that the delay memory 5 is accessed at the addresses 4, 10, . . . , 6n–2 in turn. Incidentally, the data Zo2[1] to Zo2[n] are stored at those addresses of the delay memory 5, whereas the reason why those data are stored at those addresses will be described later.

Therefore, after the period of time corresponding to the 'm+k' clocks is passed, the variables Temp[1] to Temp[n] are sequentially and respectively renewed by results of calculations "Zo2[1]×b2[1]+Temp[1]" to "Zo2[n]×b2[n]+Temp[n]"; and then, the renewed variables are stored in the temporary memory 14.

The aforementioned Table 3 shows that in the ninth state, the command ZW is contained in the contents of data stored at the address 5 of the microprogram RAM 4. In accordance with the command ZW, the '1' signal is supplied to the delay memory 5 through the delay circuit 6a after the period of time corresponding to the 'm+k' clocks is passed. Therefore, the results of the calculations "Zo2[1]×b2[1]+Temp[1]" to "Zo2[n]×b2[n]+Temp[n]" are sequentially written into the delay memory 5. At this time, the address signal Sads is set at '6n–1', so that the Table 1 shows that the address signal Sadw is set at '3', '9', '15', . . . , '6n–3' in turn. Thus, the writing address WA applied to the delay memory 5 is set at '2', '8', '14', . . . , '6n–4' in turn.

In the preceding sampling period which is one sampling period before the current sampling period, the address signal Sads has been set at '0', so that the writing address WA has been set at '3', '9', '15', . . . , '6n–3' in turn. In the previous sampling period which is two sampling periods before the current sampling period, the address signal Sads had been set at '1', so that the writing address WA had been set at '4', '10', . . . , '6n–2' in turn.

Thus, by accessing the delay memory 5 at the addresses 3, 9, 15, . . . , 6n–3 in turn, it is possible to obtain the data Zo1[1] to Zo1[n] in turn. In addition, by accessing the delay memory 5 at the addresses 4, 10, . . . , 6n–2 in turn, it is possible to obtain the data Zo2[1] to Zo2[n] in turn.

(j) Tenth State Where the Address Signal Sad1 is Set Within a Range Between '6n+1' and '7n'

In the tenth state where the address signal Sad1 is set within the range between '6n+1' and '7n', the address signal Sad2 is set at '6'. In this state, the Table 3 shows that the commands "TR" and "SEL a" are carried out. In accordance with those commands, the variables Temp[1] to Temp[n] are read from the temporary memory 14 and are supplied to the multiplier 22 through the selector 7. By executing the command "G off", the '0' signal is applied to the delay circuit 6d. In accordance with the command "TW", the '1' signal is supplied to the delay circuit 6c. The Table 2 shows that in the tenth state, the coefficients og[1] to og[n] are read from the coefficient register 13.

Therefore, after the period of time corresponding to the 'm+k' clocks is passed, the adder 23 sequentially outputs the results of the calculations "Zo2[1]×b2[1]+Temp[1]" to "Zo2[n]×b2[n]+Temp[n]", which are sequentially written into the temporary memory 14.

(k) Eleventh State Where the Address Signal Sad1 is Set Within a Range Between '7n+1' and '8n'

In the eleventh state where the address signal Sad1 is set within the range between '7n+1' and '8n', the address signal Sad2 is set at '7'. In this state, the commands TR and OW are executed, while the address signal Sad3 is delivered to the temporary memory 14 and the output register 16 respectively. Thus, the variables Temp[1] to Temp[n] are transferred to the output register 16. Then, the contents of the data stored in the output register 16 are read out by the sound-image localizing device 210 (see FIG. 1) according to needs.

(1) Next Sampling Period

In the next sampling period which is next to the current sampling period wherein the aforementioned operations are carried out again, but the address signal Sads is decremented to '6n−2'; and then, the operations similar to the aforementioned operations are carried out. In the next sampling period, however, the address signal is set at '6n−2'; hence, the foregoing results of the calculations "ig[1]×Sin[1]", "ig[2]×Sin[2]", . . . , "ig[n]×Sin[n]", which have been previously stored at the addresses 5, 11, 17, . . . , 6n−1in the delay memory 5, are now assumed as the data Zi1[1] to Zi1[n] respectively.

Similarly, the foregoing results of the calculations "Zo2[1]×b2[1]+Temp[1]" to "Zo2[n]×b2[n]+Temp[n]", which have been previously stored at the addresses 2, 8, 14, . . . , 6n−4 in the delay memory 5, are assumed as the data Zo1[1] to Zo1[n]. The data Zo1[1] to Zo1[n], which have been used in the previous sampling period, are assumed as the data Zo2[1] to Zo2[n]. The data Zi1[1] to Zi1[n], which have been used in the previous sampling period, are assumed as the data Zi2[1] to Zi2[n].

In the present embodiment, every time one sampling period is progressed, the address signal Sads is decremented by '1', so that the decremented address signal Sads is delivered to the adders **10*a* and 10*b* respectively. This means that the data stored in the delay memory 5** are somewhat shifted. The above-mentioned operations are repeatedly performed in each of the sampling periods. And, by operating the processing device of the present embodiment in a plenty of sampling periods, it is possible to effect the filtering operations on the 'n' series of musical tone signals in turn.

As described heretofore, the electronic musical instrument employing the present embodiment is advantageous in that by effectively utilizing the pipeline processing, a plenty of signals can be processed at a high speed. Further, a plurality of processes can be performed in parallel while accessing the same address of the microprogram RAM 4. Thus, the storage capacity of the microprogram RAM 4 can be extremely reduced.

Incidentally, the microprograms can represent the algorithm for the arithmetical-and-logical operations, whereas in the present embodiment, the filtering operations are executed in accordance with the predetermined algorithm. However, the algorithm which can be realized by the microprograms is not limited to the algorithm for the filtering operations. Instead, it is possible to employ another algorithm for the sound-effect-imparting operations which represent the reverberation effect, chorus effect, flanger effect or the like. Further, the present embodiment can execute the still another algorithm for the formation of the sounds in the sound source.

In general, the processing speed of the adder 23 is less than a speed of one clock. However, in the present embodiment, the processing speed is reduced to a speed of k clocks. Anyway, the processing speed of the adder 23 can be set in accordance of the operating speed of the adder element which is actually used as the adder 23.

Finally, as described before, the present embodiment is designed to effect the certain filtering operations on the plural musical tone signals. However, it is possible to modify the present embodiment such that each of the filtering operations having different characteristics is effected on each of the musical tone signals.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. A processing device for performing an operation on a plurality of waveforms in accordance with a predetermined algorithm, said processing device comprising:

first storage means for storing a sequence of commands composing said predetermined algorithm;

second storage means for storing a plurality of parameters to be used in performing said operation on said plurality of waveform samples;

first reading means for reading said sequence of commands from said first storage means at a first rate, wherein each command in said sequence is read during a different one of a plurality of command periods;

second reading means for reading parameters from said second storage means at a second rate, said second rate being faster than said first rate such that a plurality of different parameters each corresponding to one of said plurality of waveforms are read from said second storage means during each of said command periods; and executing means for executing, during each particular command period, a command read by said first reading means during said particular command period in conjunction with each of a plurality of parameters read by said second reading means during said particular command period with respect to a waveform sample from each of said plurality of waveforms, wherein said executing means operates in a pipeline manner and a result of executing a command in conjunction with a parameter with respect to a waveform sample is produced within a time lag that is less than or equal to a single one of said command periods.

2. A processing device according to claim 1, wherein said predetermined algorithm corresponds to a sound-source program.

3. A processing device according to claim 1, wherein said predetermined algorithm corresponds to an effect imparting program.

4. A processing device according to claim 1, wherein said predetermined algorithm corresponds to a filtering program.

5. A processing device according to claim 1, wherein a number of said plurality of parameters read by said second reading means during a single one of said command periods equals a number of said plurality of waveforms on which said algorithm is to be performed.

6. A processing device according to claim 1 wherein said plurality of waveforms correspond to at least one musical tone.

7. A processing device according to claim 6 further comprising pitch designating means for designating a pitch of said at least one musical tone.

8. A processing device according to claim 1, wherein said plurality of parameters stored in said second storage means are organized into a plurality of sets corresponding to said plurality of waveforms.

9. A processing device according to claim 8, wherein during a single one of said command periods, said second reading means reads one parameter from each of a number of said plurality of sets equal to a number of said plurality of waveforms on which said algorithm is to be performed.

10. An electronic musical instrument comprising:

tone signal generating means for generating a plurality of tone signals;

pitch designation means for designating a pitch associated with each of said plurality of tone signals;

first storage means for storing a sequence of commands composing a predetermined algorithm to be applied to said plurality of tone signals;

second storage means for storing a plurality of parameters to be used in applying said algorithm to said plurality of tone signals;

first reading means for reading said sequence of commands from said first storage means at a first rate, wherein each of said commands in said sequence is read during a different one of a plurality of command periods;

second reading means for reading parameters from said second storage means at a second rate, said second rate being faster than said first rate such that a plurality of different parameters each corresponding to one of said plurality of tone signals are read from said second storage means during each of said command periods; and executing means for, during each particular command period, executing a command read by said first reading means during said particular command period in conjunction with each of a plurality of parameters read by said second reading means during said particular command period with respect to each of said plurality of tone signals, wherein said executing means operates in a pipeline manner and a result of executing a command in conjunction with a parameter with respect to a tone signal is produced within a time lag that is less than or equal to a single one of said command periods.

11. An electronic musical instrument according to claim 10, wherein said plurality of tone signals represent musical tones.

12. An electronic musical instrument according to claim 10, wherein said predetermined algorithm corresponds to a sound-source program.

13. An electronic musical instrument according to claim 10, wherein said predetermined algorithm corresponds to an effect imparting program.

14. An electronic musical instrument according to claim 10, wherein said predetermined algorithm corresponds to a filtering program.

15. An electronic musical instrument according to claim 10, wherein a number of said plurality of parameters read by said second reading means during a single one of said command periods equals a number of said plurality of tone signals to which said algorithm is to be applied.

16. An electronic musical instrument according to claim 10, wherein said plurality of parameters stored in said second storage means are organized into a plurality of sets corresponding to said plurality of tone signals.

17. An electronic musical instrument according to claim 16, wherein during a single one of said command periods, said second reading means reads one parameter from each of a number of said plurality of sets equal to a number of said plurality of tone signals to which said algorithm is to be applied.

18. A method for performing an operation on a plurality of waveforms in accordance with a predetermined algorithm, said method comprising:

reading a sequence of operational commands composing said predetermined algorithm from a first storage means at a first rate, wherein each of said operational commands in said sequence is read during a different one of a plurality of command periods;

reading parameters from a second storage means at a second rate, said second rate being faster than said first rate such that a plurality of different parameters each corresponding to one of said plurality of waveforms are read from said second storage means during each of said command periods; and executing, during each particular command period, a command read during said particular command period in conjunction with each of a plurality of parameters read during said particular command period with respect to a waveform sample from each of said plurality of waveforms, wherein said executing occurs in a pipeline manner and a result of executing a command in conjunction with a parameter with respect to a waveform sample is produced within a time lag that is less than or equal to a single one of said command periods.

19. A method according to claim 18, wherein said predetermined algorithm corresponds to a sound-source program.

20. A method according to claim 18, wherein said predetermined algorithm corresponds to an effect imparting program.

21. A method according to claim 18, wherein said predetermined algorithm corresponds to a filtering program.

22. A method according to claim 18, wherein a number of said plurality of parameters read during a single one of said command periods equals a number of said plurality of waveforms on which said algorithm is to performed.

23. A method according to claim 18, wherein said plurality of waveforms correspond to at least one musical tone.

24. A method according to claim 23 further comprising designating a pitch of said at least one of said musical tones.

25. A method according to claim 18, wherein said plurality of parameters stored in said second storage means are organized into a plurality of sets corresponding to said plurality of waveforms.

26. A method according to claim 25, wherein said step of reading parameters from a second storage means at a second rate comprises reading one parameter from each of a number of said plurality of sets equal to a number of said plurality of waveforms on which said algorithm is to be performed.

* * * * *